July 20, 1937.

L. W. CHUBB 2,087,795

VEHICLE LIGHTING SYSTEM

Filed July 29, 1920

WITNESSES:
R. J. Fitzgerald
J. P. Warnet

INVENTOR
Lewis Warrington Chubb.
BY
Jesse R. Langley
ATTORNEY

Patented July 20, 1937

2,087,795

UNITED STATES PATENT OFFICE 2,087,795

VEHICLE LIGHTING SYSTEM

Lewis Warrington Chubb, Edgewood Park, Pa.

Application July 29, 1920, Serial No. 399,713

37 Claims. (Cl. 88—1)

My invention relates to systems of vehicle lighting and it has for its object the prevention of blinding glare to drivers of approaching vehicles or to other individuals while providing abundant illumination of the roadway.

The dangers of operating motor vehicles or railway trains when temporarily blinded by the glare of the lights of approaching vehicles or trains are well known. Many regulations have been made in attempts to eliminate the effects of brilliant headlights. Such regulations have either been ineffective or have resulted in the almost equally dangerous condition of insufficient illumination of the road ahead.

It is well known, also, that the drivers of automobiles and railway locomotives must employ a strong headlight at night in order that the roadway may be clearly visible for a considerable distance ahead. A person facing such headlight is blinded because of the contraction of the iris of the eye. He is, accordingly, unable to see objects in, or nearly in, the direction of the light. The use of dimmers, diffusing lenses or other devices has proven unsatisfactory in that the degree of illumination is below that necessary for safe operation.

According to my invention, I provide a system of lighting which insures proper illumination of the roadway, but provides means whereby the usual glare of an approaching vehicle is avoided. Broadly considered, my invention consists in employing light of certain characteristics and in providing protective means for observing the roadway that is opaque to the direct light of an approaching vehicle but is transparent to the reflected light of the driver's vehicle or to that of a vehicle going in the same direction.

This selective effect may be secured in several ways. The lights of vehicles may correspond in color to their direction of travel. Absorbing color screens may be used to protect against the lights of approaching vehicles. Polarized light may be employed.

In such case, the driver of a vehicle is provided with an absorbing or analyzing means that is suitably arranged relatively to the angle of polarization of the direct light and to that of the lights of his vehicle.

In the accompanying drawing.

Figure 1:
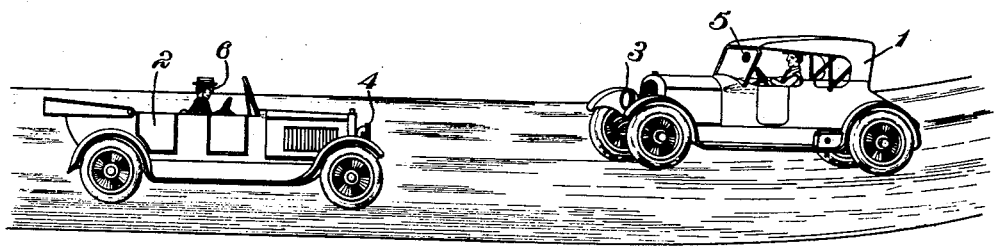
Figure 1 is a diagrammatic view of my invention as applied to automobiles.

The operation of my system may be understood by reference to Fig. 1. It may be assumed that two automobiles 1 and 2 are approaching each other at night and that the vehicles are respectively provided with headlights 3 and 4 for providing light of different characteristics with reference to the direction of its propagation. The automobile 1 is provided with a screen 5, located on the windshield, that is capable of absorbing the light from the headlights 4 of the other automobile. The driver of the automobile 2 is provided with spectacles or goggles 6 which similarly protect him from the light of headlights 3.

If the arrangement is one in which lights of different colors are used, that of the headlights 4 may be, for example, yellow, while that of the headlights 3 may be a mixture of red and green. The goggles 6 should, in such case, be yellow in color and be capable of absorbing all red and green light. Conversely, the screen 5 should absorb yellow light and transmit red and green light. It will be obvious that, by means of a system of this character, each driver may enjoy the full illuminating effect of his own lights and, at the same time, be free from the glare of vehicles traveling in the opposite direction.

When color combinations are employed in the manner described above, it will be obvious that traffic regulations are necessary to insure that vehicle lights conform to the prescribed colors for each direction of travel. It is necessary to provide means whereby the colors of the lights and of the absorbing screens may be changed with the direction of travel.

Because of the necessity for changing the colors of lights for different directions of travel and, by reason of the fact that certain colors which may be employed in connection with railway signals are not easily distinguished when absorbing screens are employed, I have found that the use of polarized light is preferable.

In the preferred form of my invention, I employ light from any usual or suitable source that is polarized by any of the well-known means, certain of which are illustrated in the drawing and are hereinafter described. An absorber or analyzer is so arranged relatively to the angle of polarization of the lights of approaching vehicles that it is optically crossed with respect to the rays of such lights. The analyzer corresponds, however, to the angle of polarization of the lights of the driver's vehicle and of such vehicles as may be traveling in the same direction.

The analyzer may be said to coincide optically with the light of the driver's vehicle.

If, in the case of the vehicles of Fig. 1, the light of headlights 3 were polarized in a vertical plane and that of the headlights 4 in a horizontal plane, the planes of polarization are perpendicular to each other. Accordingly, if the driver of each machine uses an absorber or analyzer that is opaque to the light rays of the other machine, he can see the roadway and all objects illuminated by his own headlights as perfectly as if the other machine were not present.

Since the employment of light polarized in vertical and horizontal planes requires that the planes of both the polarizing element and the analyzer be changed 90° with a change in direction of travel, I prefer to arrange the angle of polarization at 45° to the horizontal. Then all vehicles and drivers may be equipped uniformly and the planes of polarization of the light rays of any pair of approaching vehicles are always mutually at right angles to each other. No changes of any kind are necessary when the direction of travel is changed.

The plane of polarization may be represented by a person's extending the left forearm, for example, diagonally before the face, that is, substantially 45° to the horizontal, and considering the eyes as the source of polarized light. Then, if the person faces in the opposite direction, the left forearm will be at an angle of 90° from its former position. This change in position corresponds to that of the plane of polarization of the vehicle light which maintains its angle of 45° to the vertical when changing its direction.

To carry the illustration further, if two persons with their left forearms held as previously described stand facing in the same direction, their forearms represent parallel planes of polarization. A source of light and an analyzer having such planes are said to be "optically coincident" because the analyzer is transparent to the light rays. This is the relation of each source of light and analyzer carried by a vehicle equipped in accordance with my invention.

If, however, two persons holding their forearms in the same manner stand facing each other, their arms represent planes of polarization that are at right angles to each other and are 45° to the horizontal. A source of light and an analyzer having such planes may be said to be "optically crossed" since the analyzer is opaque to the light rays. This is the relation of the lights of vehicles pointed in opposite directions or of the light of one and the analyzer of another of oppositely directed vehicles.

The details of suitable forms of apparatus for practicing my invention will now be described.

Figure 2:
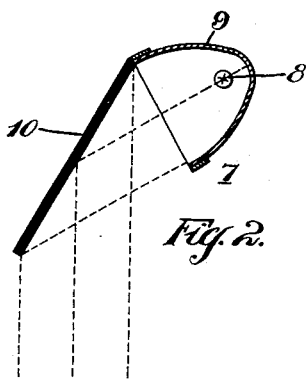
Fig. 2 is a sectional view of a lamp arranged to project polarized light.
Figure 3:
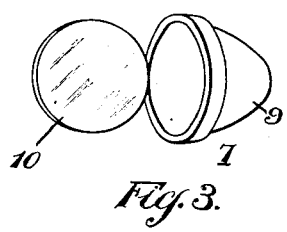
Fig. 3 is a front view of the lamp of Fig. 2.

In Figs. 2 and 3 is illustrated one form of polarizing lamp, the paths of certain of the light rays being indicated by dotted lines (Fig. 2). A lamp 7, having a source 8 and a parabolic reflector 9, is provided with a polarizing reflector 10 of elliptical shape which may consist of several sheets of plate glass or other suitable substance. The angle of the reflector 10 to the axis of the reflector 9 corresponds to the critical angle at which reflected light is polarized by the reflector 10. Light from the source 8 is reflected by the reflector 9 in substantially parallel rays to the polarizing reflector 10. Substantially all of the light reflected by the reflector 10 is polarized when it is at its critical angle with respect thereto. This action is in accordance with a well-known phenomenon. The critical angle may be determined by testing the particular material to be employed in the polarizing reflector. The lamp is, therefore, so mounted that the reflected or polarized beams illuminate the roadway.

Fig. 3 is a front view of the lamp of Fig. 2 as viewed at an angle to the axis of the parabolic reflector 9. It will be noted that the polarizing reflector 10, when viewed from a position in the direction of the dotted lines; Fig. 2, appears to have the form of a circle. The elliptical shape is employed in order that the apparent source of light may appear to have the usual or conventional form.

Figure 4:
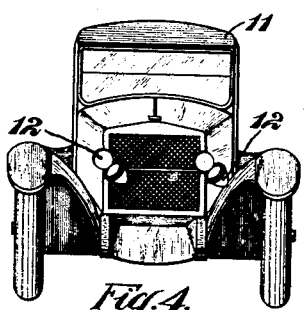
Fig. 4 is a view of the front of an automobile equipped with the lamps of Figs. 2 and 3.

Fig. 4 illustrates an automobile 11 equipped with headlights 12 of the type shown in Figs. 2 and 3. The lamps of all automobiles are so mounted that the angle of polarization is 45° to the horizontal always measured in the same direction either clockwise or counter-clockwise for all vehicles. The illustrated arrangement is not a symmetrical one, but it may be made so by proper design. It will be understood that the illustrations are more or less diagrammatic for the purpose of explaining the principle of operation and that the matter of exterior appearance may be provided for in any desired manner.

Figure 5:
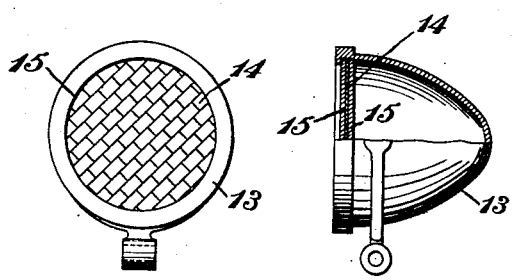
Fig. 5 is a front view of a lamp provided with a suitable substance for polarizing transmitted light.
Figure 6:
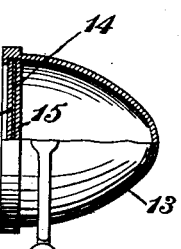
Fig. 6 is a view, partially in side elevation and partially in section, of the lamp of Fig. 5.

Instead of polarizing light by reflection, suitable dichroic polarizing substances, such as tourmaline plates or crystals of sulphate of iodo-quinine may be employed. Figs. 5 and 6 illustrate a lamp 13 of the usual type having a polarizing substance 14 covering the front glass 15 and inclined at the desired angle or oriented. I have found that it is preferable to cement the individual pieces of the polarizer to the inside of the cover glass or to place it between two glass plates 15, as illustrated in Fig. 6.

Figure 7:
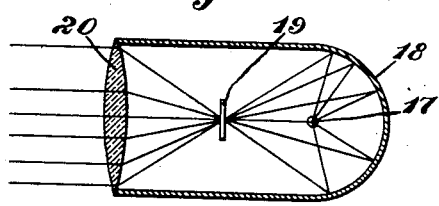
Fig. 7 is a sectional view of a lamp in which a small polarizer may be employed, the path of certain of the light rays being shown.

Still another form of lamp is shown in Fig. 7. Light from a source 17 is focused by a reflector 18 and passes through a small polarizer 19, which may be a Nicol's prism, tourmaline plate, or other suitable substance. The divergent rays are then refracted by a lens 20 into a beam of substantially parallel rays of polarized light.

As in the case of the lamps shown in Figs. 2 to 6, the angle of polarization is preferably 45° to the horizontal in the same direction of rotation whereby the direction of travel is immaterial.

The absorber or analyzer employed in the system using polarized light may have various forms, such as a small area on the windshield, goggles or eye-glasses. The analyzer must consist of a polarizing substance arranged at such angle that it is opaque to the polarized light of an approaching headlight. I have found clear tourmaline and crystals of sulphate of iodo-quinine to be very effective for this purpose.

In the preferred arrangement, the crystals are cemented to or between glass plates of goggles. When the analyzer is near the eye, it may be small in area and yet effectively protect the pupil of the eye against blinding glare.

Figure 8:
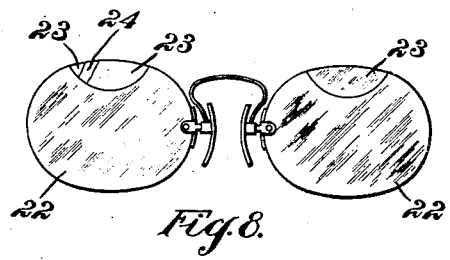
Fig. 8 is a front view of a pair of eye-glasses only a portion of each of the lenses of which are covered by an absorber.

A bi-vision glass, such as the glass 22 illustrated in Fig. 8 may be easily adapted for use in this connection. It consists of two plates 23 of glass between which is sealed thin plates 24 of sulphate of iodo-quinine. The outside surfaces of the glass plates 23 are ground to the optical prescription of the wearer and may thus serve a double purpose. The wearer will instinctively bow his head when a strong light approaches and will observe the road through the plates 24, which are in the upper portion of the eye-pieces, without experiencing any effects of the glare of the polarized light.

Crystals of sulphate of iodo-quinine, or, as it is sometimes termed, "iodo-sulphate of quinine", possess the very desirable characteristic of not having a critical angle with respect to its selective admission or absorption of polarized light. This characteristic is very valuable in the operation of automobiles or other vehicles since their angles to the horizontal are constantly changing by reason of variations in the surface of the roadway.

The changing angles of vehicles cause changes in their angles to each other and consequently variations in the directions of light projected from the vehicles and in the angles at which it is received by viewing devices of other vehicles. Sulphate of iodo-quinine is effective as a protective device substantially regardless of such variations in the angles between the light received and the plane of the surface of the protective device.

The foregoing applies also to goggles and eye-glasses in which changes in the angles at which light is received may be caused by movement of the wearer as well as variations in level of the roadway.

Absorbers may also take the form of detachable or special skeleton shades or goggles for persons who do not normally wear glasses.

It will be appreciated that the employment of a system of the character described permits the employment of lamps of relatively high candle-power without the necessity for using dimmers or diffusing devices which render the roadway obscure when passing other vehicles. At such time, is is especially necessary to have a clear view of the boundaries of the roadway and of the approaching vehicle in order that they may pass safely. All evil effects of blinding glare are entirely eliminated.

It will be appreciated that when polarized light is employed in accordance with my system, the driver receives any reflected polarized light from his headlights or any other vehicle proceeding in the same direction. He also receives light from any objects that are illumined by unpolarized light or by diffused or depolarized light.

My improved system is of particular value on rainy nights when glare of lights is intensified and when all surfaces are wet and reflect a high percentage of light received by them. The analyzer admits polarized light from the driver's vehicle that is returned by specular reflection from the mirror-like surfaces and renders these objects, such as other vehicles, plainly visible.

At the same time, any direct or reflected polarized light from other vehicles going in the opposite direction is absorbed and the effects of glare are entirely avoided.

While I have shown and described my invention as applied to automobiles, it may be employed with equal and even greater advantage to railway systems since its use, in the preferred form, does not, in any manner, interfere with the operation of the usual signal systems.

I claim as my invention:

1. A headlight system for motor vehicles comprising lamps each provided with means for polarizing a beam of light in a plane substantially 45° to the horizontal to be transmitted ahead of the vehicle and a protective device for the driver of the vehicle comprising a light-polarizing device that optically coincides with the polarizing means for the lamps, whereby the protective device admits light polarized in the same plane as that of the light of said lamps but is opaque to the light of approaching vehicles similarly equipped.

2. A headlight system for vehicles comprising lamps each of which is provided with means for polarizing a beam of light in a plane 45° to the vertical to be transmitted ahead of the vehicle and a protective device for the driver of the vehicle comprising an analyzer for admitting light polarized in the same plane as that of the light of said lamps whereby the driver may view objects illumined by the lights of his vehicle and of other vehicles having similar directions but is protected from the glare of similarly equipped vehicles having directions opposite to those of the vehicle of the driver since the planes of polarization of the lamps of the latter vehicles are automatically at right angles to those of said vehicle and to the analyzer of the driver.

3. A vehicle headlight system comprising a source of light having a certain characteristic and viewing means adjacent the driver for selectively transmitting substantially only light having said characteristic that is projected approximately in the same direction as that of the light from said source.

4. A vehicle headlight system comprising a source of light having a certain characteristic and viewing means for selectively transmitting substantially only light from said source and light projected approximately in the same direction as that of the light from said source and absorbing substantially only light projected from another vehicle similarly equipped in directions approximately opposite to that of the light from said source.

5. A headlight system for vehicles which comprises a plurality of sources of light having different relative characteristics according as said sources are directed in the same direction or in opposite directions and viewing means for each vehicle for selectively admitting light from vehicles projected in the same direction as that of the corresponding vehicle and absorbing light from vehicles projected approximately in the opposite direction.

6. A vehicle headlight system comprising a source of polarized light and an analyzing means whose plane of polarization is arranged to coincide optically with that of said polarized light for excluding light not conforming to said plane.

7. A vehicle headlight system comprising a source of light, means for polarizing said light at an angle to the horizontal and viewing means for the driver of said vehicle for selectively transmitting substantially all such plane polarized light as conforms in its plane of polarization approximately to such angle.

8. A vehicle headlight system comprising a source of light, means for plane polarizing said light at an angle of substantially 45° to the horizontal and means for transmitting, substantially all of such polarized light as conforms to such angle.

9. A vehicle headlight system embodying means for selectively absorbing or transmitting polarized light according to its plane of polarization, and a source of polarized light that is optically coincident with said selective means.

10. A headlight system for vehicles having means for preventing glare comprising a source of light polarized substantially at an angle of 45° to the horizontal and polarizing means coinciding optically with said polarized light through which the field illumined by said polarized light may be observed.

11. The method of lighting motor vehicles comprising projecting from such a vehicle light having a predominant characteristic and protecting the driver's eyes from light having other predominant characteristics while predominantly admitting said projected light to his eyes.

12. Means for lighting motor vehicles comprising means for projecting from said vehicle light having a predominant polarization characteristic and means for protecting the driver's eyes from light having other polarization characteristics while predominantly admitting said projected light to his eyes.

13. A device for protecting from the light of an approaching vehicle, the eyes of the driver of a vehicle caused to assume varying angles with the horizontal by reason of roadway conditions, said device comprising a plate of sulphate of iodo-quinine arranged to polarize light in a plane substantially 45° to the horizontal and having substantially uniform characteristics with respect to admitting light substantially regardless of the angle between said light and the plane of the surface of said plate.

14. In a headlight system for vehicles, the method of avoiding the glare effect of light transmitted from oppositely directed vehicles which consists in plane polarizing at an angle of 45° from the vertical the rays projected from each vehicle and observing the field of view through a selective screen which admits light polarized in a plane substantially parallel to the plane of the polarized light transmitted from the corresponding vehicle but absorbs light projected from an oppositely directed vehicle and polarized in a plane approximately at right angles to the plane of polarization of the light admitted by the selective screen.

15. In a lighting system, a polarizer comprising two plates of glass and a plurality of closely adjacent dichroic crystal structures secured therebetween and optically oriented for polarization in substantially parallel planes.

16. In a lighting system, a polarizing device comprising two plates of glass and a plurality of crystals of iodo-sulphate of quinine cemented between said plates and optically oriented for polarization in substantially parallel planes.

17. In a lighting system, polarizing means comprising transparent supporting means having secured thereon crystals of iodo-sulphate of quinine that are similarly oriented optically and arranged for polarization at a predetermined angle to the horizontal.

18. In a lighting system, polarizing means comprising two transparent plates, a plurality of closely adjacent structures of crystals of iodo-sulphate of quinine cemented therebetween and oriented with their optical axes parallel, said polarizing means having the property of absorbing light of a certain azimuth substantially independent of the angle of incidence thereof and the property of projecting plane polarized light.

19. In a lighting system, a transparent viewing device comprising a plurality of areas forming a single convergent field of vision, one of said areas comprising transparent material having thereon polarizing crystals oriented in such azimuth as to intercept certain plane polarized light directed toward the pupil of the eye of the observer while light of other characteristics is admitted through all of said areas.

20. In a lighting system, a viewing device permitting a continuous field of vision for natural light, a plurality of closely adjacent crystals of dichroic material disposed on a portion of the viewing device, the crystals being oriented optically at such angle as to exclude certain plane polarized light but without affecting the continuity of vision of the field of natural light.

21. In a lighting system, a polarizing device comprising a plurality of closely adjacent separate structures of crystals of iodo-sulphate of quinine oriented for the polarization of light in parallel planes and a transparent support upon which said structures are disposed.

22. A polarizing device comprising two superposed sheets of transparent material and a layer of crystals of iodo-sulphate of quinine therebetween and optically oriented to absorb light vibrations of a certain azimuth and to transmit light vibrations of an azimuth at right angles thereto.

23. Means for protecting from the glare of headlights employing polarized light, comprising a transparent plate having crystals of sulphate of iodo-quinine secured thereto with their respective planes of polarization substantially all parallel.

24. Means for protecting from the glare of headlights, employing polarized light, comprising a transparent plate having optically oriented crystals secured thereto.

25. Means for protecting from the glare of headlights, employing polarized light, comprising a transparent plate having oriented crystals thereon, said crystals having the property of absorbing polarized light of a given azimuth substantially independent of the angle of incidence and having also the property of projecting substantially divergent plane polarized light.

26. Means for protecting from the glare of headlights, employing polarized light, comprising transparent viewing screens permitting a continuous field of vision for convergent natural light and a discontinuous field of vision comprising optically oriented crystals of dichroic material disposed closely adjacent one another for light polarized at a particular angle.

27. Means for protecting from the glare of headlights, employing polarized light, comprising transparent viewing screens permitting a continuous field of vision for convergent natural light and a discontinuous field of vision comprising optically oriented closely adjacent crystals of iodo-sulphate of quinine for light polarized at a particular angle.

28. An article of manufacture, a medium comprising a transparent support, and a layer thereon of a dichroic substance the crystals of which are arranged to a predominant extent parallel to one another thereby being rendered capable of polarizing a substantial part of light transmitted thereby.

29. A light polarizer comprising a transparent support and an adherent film thereon of a light transmitting dichroic substance having elongated crystals oriented in parallel lines to a predominant extent, said film thus being rendered capable of polarizing a substantial part of light transmitted thereby.

30. In a device for avoiding glare from automobile headlights and the like, the combination comprising a headlight adapted to project a beam of light, a relatively thin crystalline layer interposed in the path of said beam, the crystals of said layer being dichroic and transparent and having their axes oriented so as to emit light polarized in substantially a single plane, a cooperating vizor through which diffused and reflected light may be perceived, said vizor being coated with dichroic, transparent crystals having their optical axes arranged to transmit only light polarized in a plane which is substantially perpendicular to the first said plane.

31. In a device for avoiding glare from automobile headlights and the like, the combination comprising a headlight adapted to project a beam of light, a relatively thin crystalline layer interposed in the path of said beam, the crystals of said layer being dichroic and transparent and having their axes oriented so as to emit light polarized in substantially a single plane, a cooperating vizor through which diffused and reflected light may be perceived, said vizor being coated with dichroic, transparent crystals having their optical axes arranged to transmit only light polarized in a plane which is substantially parallel to the first said plane.

32. An article of manufacture comprising a plurality of crystals of dichroic material, all disposed with their optical axes extending in substantially the same direction and means cooperative for supporting the crystals as disposed to provide a polarizing screen.

33. An article of manufacture comprising a plurality of crystals of dichroic material, the crystals being oriented with their optical axes all extending in substantially the same direction, means for retaining the crystals in their oriented relation providing a screen through which diffused and reflected light may be perceived and which may be employed for transmitting plane polarized light.

34. Eye-glasses, comprising a pair of lenses, a plurality of dichroic crystals disposed on each lens, the crystals on each lens having their optical axes oriented in substantially the same direction.

35. Eye-glasses, comprising in combination two lenses, a plurality of closely adjacent crystals of dichroic material associated with each lens, all portions of the dichroic material on each lens having their optical axes set with substantially the same orientation.

36. Eye-glasses, comprising in combination two lenses ground to a predetermined optical prescription, a plurality of crystals of dichroic material applied to each lens, all crystals of the dichroic material applied to each lens having a substantially common orientation, the lenses being set in predetermined relation to one another.

37. In a lighting system for vehicles, in combination, a source of light carried by a vehicle, a polarizer for polarizing the light projected from said source of light, a polarizing screen for viewing purposes associated with the polarizer provided for polarizing the projected light, the polarizer and polarizing screen being so disposed relative to one another that their respective planes of polarization are substantially diagonal to a horizontal plane and the plane of polarization of the polarizer associated with the source of light is at substantially right angles to the plane of polarization of a polarizing viewing screen on a similarly equipped vehicle disposed in a substantially opposed relation and the plane of polarization of the polarizing viewing screen is at substantially right angles to the plane of polarization of the polarizer provided for polarizing the light projected from the opposed vehicle.

LEWIS WARRINGTON CHUBB.